US008229940B2

(12) United States Patent
Allen et al.

(10) Patent No.: US 8,229,940 B2
(45) Date of Patent: Jul. 24, 2012

(54) QUERY PREDICATE GENERATOR TO CONSTRUCT A DATABASE QUERY PREDICATE FROM RECEIVED QUERY CONDITIONS

(75) Inventors: Thomas Bradley Allen, Henderson, NV (US); Barry Mark Caceres, Las Vegas, NV (US); Keith Alan Caceres, Las Vegas, NV (US)

(73) Assignee: International Business Machines Corporation, Armonk, NY (US)

( * ) Notice: Subject to any disclaimer, the term of this patent is extended or adjusted under 35 U.S.C. 154(b) by 773 days.

(21) Appl. No.: 11/778,622

(22) Filed: Jul. 16, 2007

(65) Prior Publication Data

US 2009/0024593 A1 Jan. 22, 2009

(51) Int. Cl.
G06F 7/00 (2006.01)
G06F 17/30 (2006.01)
(52) U.S. Cl. ........................................ 707/758; 707/713
(58) Field of Classification Search .................. 707/2–5, 707/713, 758, 759, E17.075
See application file for complete search history.

(56) References Cited

U.S. PATENT DOCUMENTS

| 5,412,807 | A |   | 5/1995 | Moreland |        |
|-----------|---|---|--------|----------|--------|
| 5,664,172 | A | * | 9/1997 | Antoshenkov | 707/4 |
| 5,884,304 | A | * | 3/1999 | Davis et al. | 1/1 |
| 5,924,089 | A | * | 7/1999 | Mocek et al. | 1/1 |
| 5,950,190 | A | * | 9/1999 | Yeager et al. | 707/3 |
| 6,035,311 | A |   | 3/2000 | McCool et al. |    |
| 6,430,552 | B1 |  | 8/2002 | Corston-Oliver |   |
| 6,453,312 | B1 | * | 9/2002 | Goiffon et al. | 1/1 |
| 6,748,377 | B1 |  | 6/2004 | Attaluri |         |
| 6,768,997 | B2 |  | 7/2004 | Schirmer et al. |  |
| 6,915,290 | B2 | * | 7/2005 | Bestgen et al. | 707/2 |
| 2002/0059297 | A1 |   | 5/2002 | Schirmer et al. |   |
| 2002/0123984 | A1 | * | 9/2002 | Prakash | 707/1 |
| 2003/0120682 | A1 | * | 6/2003 | Bestgen et al. | 707/104.1 |
| 2003/0163455 | A1 | * | 8/2003 | Dettinger et al. | 707/3 |
| 2004/0068489 | A1 | * | 4/2004 | Dettinger et al. | 707/3 |
| 2004/0139060 | A1 |   | 7/2004 | Maxwell, III |     |
| 2004/0172520 | A1 |   | 9/2004 | Smit et al. |      |
| 2004/0215638 | A1 | * | 10/2004 | Kapoor et al. | 707/100 |

(Continued)

FOREIGN PATENT DOCUMENTS

JP   2006155663   6/2006

OTHER PUBLICATIONS

Sherman, C., (Exec. Ed.), "Search Engine Watch: In Praise of Fuzzy Searching", Jul. 6, 2001, 2 pp.

(Continued)

Primary Examiner — Charles Kim
Assistant Examiner — Jessica N Le
(74) Attorney, Agent, or Firm — Patterson & Sheridan, LLP

(57) ABSTRACT

Provided are a method, system, and article of manufacture for a query predicate generator to construct a database query predicate from received query conditions. A plurality of query conditions are received, wherein each query condition includes a comparison operator and a comparison value for a database attribute, and wherein the comparison operator is capable of comprising matching and non-matching operators. The query conditions are processed to determine at least one logical operator to include between the query conditions. A database query predicate is generated to use in a database query to apply against the database comprising the received query conditions chained using the determined logical operators.

24 Claims, 8 Drawing Sheets

U.S. PATENT DOCUMENTS

| | | | |
|---|---|---|---|
| 2005/0071326 A1* | 3/2005 | Brown et al. | 707/3 |
| 2005/0192940 A1* | 9/2005 | Morris | 707/3 |
| 2005/0228768 A1* | 10/2005 | Thusoo et al. | 707/1 |
| 2006/0100989 A1* | 5/2006 | Chinchwadkar et al. | 707/3 |
| 2006/0116999 A1* | 6/2006 | Dettinger et al. | 707/4 |
| 2006/0277157 A1* | 12/2006 | Seidl et al. | 707/2 |
| 2007/0027845 A1* | 2/2007 | Dettinger et al. | 707/3 |
| 2007/0073657 A1* | 3/2007 | Santosuosso | 707/3 |
| 2007/0112727 A1* | 5/2007 | Jardine et al. | 707/3 |
| 2007/0266017 A1* | 11/2007 | Held et al. | 707/4 |
| 2008/0133570 A1* | 6/2008 | Allen et al. | 707/102 |
| 2010/0161646 A1* | 6/2010 | Ceballos et al. | 707/769 |

OTHER PUBLICATIONS

U.S. Appl. No. 11/566,492, filed Dec. 4, 2006, entitled "Determining Boolean Logic and Operator Precedence of Query Conditions", invented by T.B. Allen, K. Caceres, M.H. D'Amico, B.L. Hunt, K.M. Nojima, and M.N. Schwenger.

* cited by examiner

FIG. 2

User Interface

| Attribute | Operator | Value |
|---|---|---|
| First Name | Starts with | Jo |
| First Name | Equals | Jane |
| Last Name | Equals | Doe |
| Birth Date | Greater-than or equal | 2006/01/01 |
| Birth Date | Less-than or equal | 2006/12/31 |

Add more criteria

FIG. 3

Query Conditions

First name = 'John'
First name starts-with 'Jo'
Last name = 'Doe'
First name = 'Jane'
Last name = 'Doe'
Zip code != '89129'
Zip code does-not-start-with '9'
Phone area code = 702
Phone area code = 775
Zip code != '89128'
Zip code != '90210'
Birth date > 1970-01-01 (YYYY-MM-DD)
Birth date < 1990-01-01
Birth date >= 1970-01-01
Birth date < 1990-01-01
Birth date < 1980-01-01
Account balance > $1,000,000

Modified/Unmodified Parenthesized Groups — 156

156a — Group "First name/matching":
(First name = 'John' OR First name = 'Jane' OR First name starts-with 'Jo')

154b — Group "Last name/matching":
(Last name = 'Doe')

152c — Group "Zip code/non-matching":
(Zip code != '89129' Zip code != '89128', Zip code does-not-start-with '9', Zip code != '90210')

156d — Group "Phone area code/matching":
(Phone area code = 702 OR Phone area code = 775)

154e — Group "Birth date/range":
(Birth date > 1970-01-01, Birth date < 1990-01-01, Birth date >= 1970-01-01, Birth date < 1980-01-01)

152f — Group "Account balance/range":
(Account balance > $1,000,000)

FIG. 8

Modified/Unmodified Parenthesized Groups — 158

156a — Group "First name/matching":
(First name = 'John' OR First name = 'Jane' OR First name starts-with 'Jo')

154b — Group "Last name/matching":
(Last name = 'Doe')

158c — Group "Zip code/non-matching":
(Zip code != '89129' AND Zip code != '89128' AND Zip code does-not-start-with '9' AND Zip code != '90210')

156d — Group "Phone area code/matching":
(Phone area code = 702 OR Phone area code = 775)

154e — Group "Birth date/range":
(Birth date > 1970-01-01, Birth date < 1990-01-01, Birth date >= 1970-01-01, Birth date < 1980-01-01)

152f — Group "Account balance/range":
(Account balance > $1,000,000)

FIG. 9

Modified/Unmodified Parenthesized Groups — 164

- 164a — Group "First name/matching":
  (First name = 'Jane' OR First name starts-with 'Jo')
- 154b — Group "Last name/matching":
  (Last name = 'Doe')
- 158c — Group "Zip code/non-matching":
  (Zip code != '89129' AND Zip code != '89128' AND Zip code does-not-start-with '9')
- 156d — Group "Phone area code/matching":
  (Phone area code = 702 OR Phone area code = 775)
- 162e — Group "Birth date/range":
  (Birth date < 1990-01-01 AND Birth date >= 1970-01-01)
- 152f — Group "Account balance/range":
  (Account balance > $1,000,000)

FIG. 12

Modified/Unmodified Parenthesized Groups — 166

- 164a — Group "First name/matching":
  (First name = 'Jane' OR First name starts-with 'Jo') AND
- 154b — Group "Last name/matching":
  (Last name = 'Doe') AND
- 158c — Group "Zip code/non-matching":
  (Zip code != '89129' AND Zip code != '89128' AND Zip code does-not-start-with '9') AND
- 156d — Group "Phone area code/matching":
  (Phone area code = 702 OR Phone area code = 775) AND
- 162e — Group "Birth date/range":
  (Birth date < 1990-01-01 AND Birth date >= 1970-01-01) AND
- 152f — Group "Account balance/range":
  (Account balance > $1,000,000)

FIG. 13

QUERY PREDICATE GENERATOR TO CONSTRUCT A DATABASE QUERY PREDICATE FROM RECEIVED QUERY CONDITIONS

BACKGROUND OF THE INVENTION

1. Field of the Invention

The present invention relates to a method, system, and program for a query predicate generator to construct a database query predicate from received query conditions.

2. Description of the Related Art

Many users access information in a database using a database search graphical user interface (GUI) having fields in which the user may enter search terms to search data attributes or fields in the database. For instance, in some implementations, a user interface panel is displayed to allow the user to construct a query to submit to the database to search, where each query includes zero or more query conditions that are comprised of a database attribute a comparison operator (e.g., equals, not equals, greater than, less than, etc.), and a comparison value for the attribute. The generated database query typically includes a list of attributes (columns) that define what is included in each record to retrieve from the database and a predicate that qualifies the records to be included in the results of the query. The database server evaluates the predicate for every record (row) in the search space (table/view) and returns the records that satisfy the predicate to the client. Each condition in the predicate qualification may eliminate zero or more records from the candidate set. After the database determines that a record does not satisfy a predicate, it moves on to the next candidate record.

Some database search GUIs include drop down menus from which the user may select attributes to search and conditions for those attributes. The comparison value may be entered in a separate field or also may be selected from a drop down menu if there are a limited number of possible values for the database attribute.

Other database search GUIs allow the user to construct a query predicate by entering one or more search terms to cause the database search engine to search all database attributes for the specified search terms.

Some database search GUIs further allow the user to specify logical operators between query predicate conditions, such as AND, OR, etc. to further instruct the database search engine on how to generate the database query to use to search the database. Some database search GUIs allow the user to enter the logical operator between filter conditions by entering terms such as AND, OR, +, or no operator to specify the OR operator. Other database search GUIs provide drop down menus, select boxes, or other GUI elements to allow the user to select a predefined logical operator to use between the filter conditions (e.g.: "any of these" versus "all of these" selection). Other database search GUIs provide means to control the order of operation for evaluating the query conditions in the predicate such as explicitly creating parenthesized groups and joining them with logical operators.

All the above GUI mentioned panels assist users in constructing a proper search. Without the use of such panels, a user would have to write a program including database search queries, such as Structured Query Language (SQL) statements. Typically, the database search GUIs that provide more advanced control with regards to order of precedence and/or logical operators are more difficult to use because they require the user to understand how to properly form the logical expressions associated with crafting a predicate in the underlying programming languages such as SQL.

The database search engine executes the query with its predicate against the database to access and return records or objects having attributes that satisfy the specified query predicate.

There is a need in the art for improved techniques for generating query predicates from query conditions submitted by a user or application to form a database query to execute against the database.

SUMMARY

Provided are a method, system, and article of manufacture for a query predicate generator to construct a database query predicate from received query conditions. A plurality of query conditions are received, wherein each query condition includes a comparison operator and a comparison value for a database attribute, and wherein the comparison operator is capable of comprising matching and non-matching operators. The query conditions are processed to determine at least one logical operator to include between the query conditions. A database query predicate is generated to use in a database query to apply against the database comprising the received query conditions chained using the determined logical operators.

BRIEF DESCRIPTION OF THE DRAWINGS

FIG. 2 illustrates an embodiment of a user interface to construct query predicates to search a database.

FIG. 3 illustrates an example of query conditions.

FIGS. 6-13 illustrate an example of how query predicates are processed during the operations of FIGS. 4 and 5.

DETAILED DESCRIPTION

Figure 1:
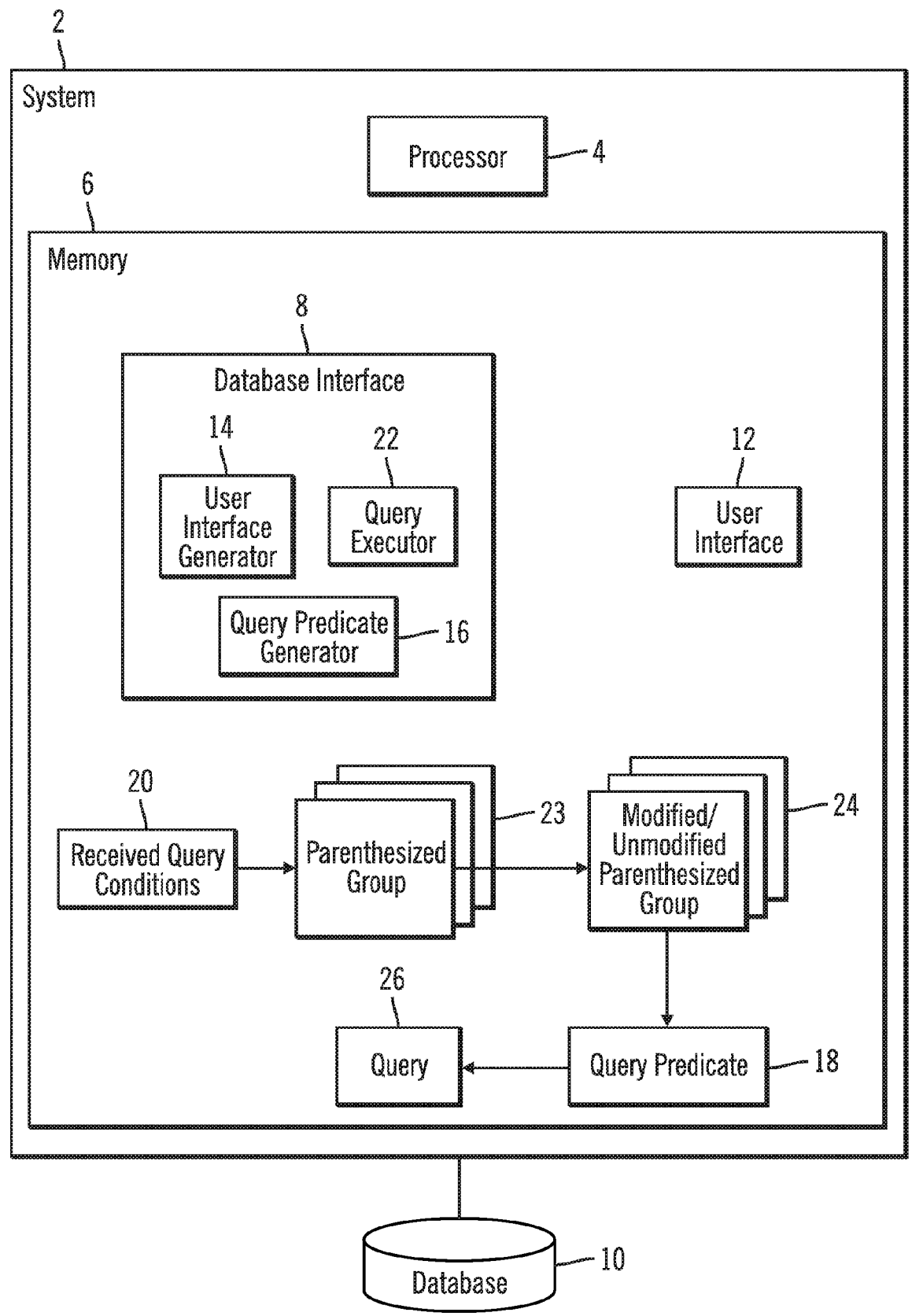
FIG. 1 illustrates of an embodiment of a computing environment.

FIG. 1 illustrates an embodiment of a computational environment. A system 2 includes a processor 4 and a memory 6. The processor 4 executes programs loaded in the memory 6, including a database interface 8 for accessing a database 10 and a user interface 12. The user interface 12 may be rendered on a display device (not shown). The database may comprise a relational database, object-oriented database, non-relational database, etc., comprising records or objects providing values for data attributes. For instance, in relational databases, the attributes may comprise columns or fields of in a database table. The database interface 8 includes a user interface generator 14 to generate the user interface 12, a query predicate generator 16 to generate the query predicate 18 portion of a query 26 based upon query conditions 20 received from a user via the user interface 12, and a query executor 22 to execute a database query 26 including the generated query predicate 18.

To generate the database query predicate 18, the query predicate generator 16 processes the received query conditions 20 to construct parenthesized groups 23, where each parenthesized group 23 comprises query conditions for the same database attribute that have the same comparison operator type. Comparison operators may be categorized as three types: "matching", "non-matching", and "range". The "matching" operator type includes the "equals" operator ("=") and "starts-with" operators. The "non-matching" operator type includes the "not equal to" ("!="/"<>") and "does-not-start-with" operators. The "range" operator type includes the "less-than" ("<"), greater-than (">"), "less-than-or-equal" ("<="), and greater-than-or-equal (">=") operators. The query predicate generator 16 processes the parenthesized groups 23 to consolidate query conditions in a parenthesized group 23 for a same attribute and determine logical operators to include between the query conditions in the parenthesized group, resulting in modified parenthesized groups 24 having query conditions chained with one or more logical operators. Parenthesized groups 23 having only one query condition may remain unmodified. The modified and unmodified parenthesized groups 24 may be logically conjoined, e.g., logically AND'd, to form the database query predicate 18.

The system 2 may comprise a suitable computational device known in the art, such as a server, desktop computer, workstation, mainframe, hand held computing device, telephony device, etc. The processor 4 may comprise one or more suitable processing units, central processing units (CPUs). The memory 6 may comprise a volatile or non-volatile memory device used by the processor 4 to store programs and data used. The database 10 may be stored in a storage device coupled to the system 2 or accessible to the system 2 over a network. The system 2 may also include other common system components such as a local storage, display monitor, input devices, etc.

In the embodiment of FIG. 1, the user interface 12 and database interface 8 are implemented in the same system 2. In alternative embodiments, the database interface 8 may be implemented in a server-type machine that receives query conditions from user interfaces running in client systems over a network. In one embodiment, the database interface 8 provides client systems (not shown) with the user interface 12 to render at the client to enable users to provide query conditions 20, execute the database query 26, and view results from executing the database query 26. For instance, in one embodiment, the database interface 8 may comprise a web server to serve pages representing the user interface 12 to the client systems to render in a web browser. In a further embodiment, the client systems may run a client database program having a user interface to enable the user to construct and submit query conditions to a database server running the database interface 8 to generate a database query predicate from the received query conditions.

FIG. 2 illustrates an embodiment of a query condition entry panel 50 rendered in the user interface 12 to enable the user to specify query conditions for database attributes 52 including comparison operators 54, e.g., equals, not-equal-to, starts-with, does-not-start-with, ranges (e.g., less than, greater than, less-than-or-equal, greater-than-or-equal, etc.), etc., and a comparison value 56 for the attribute 52. The entry panel 50 enables the user to specify different attributes, and for each specified attribute one or more comparison operators and one or more comparison values for each attribute and comparison operator pair. Each attribute/comparison operator/value triplet comprises a query condition. After entering query conditions in the entry panel 50 the user may submit the query conditions 20 to the database interface 8 to process, where the query conditions 20 may be transferred internally within the system 2 or over a network (not shown) to the system 2.

FIG. 3 illustrates an example of a set of query conditions 70 comprising an example of query conditions 20 that a user may submit to the database interface 8 using the user interface 12. The left side of each listed query condition comprises the database attribute, e.g., "First name", "Last name", "Zip code", etc., followed by a comparison operator, e.g., =, !=, <, >, etc., further followed by a value, e.g., "John", "Jo", 89128, etc.

Figure 4:
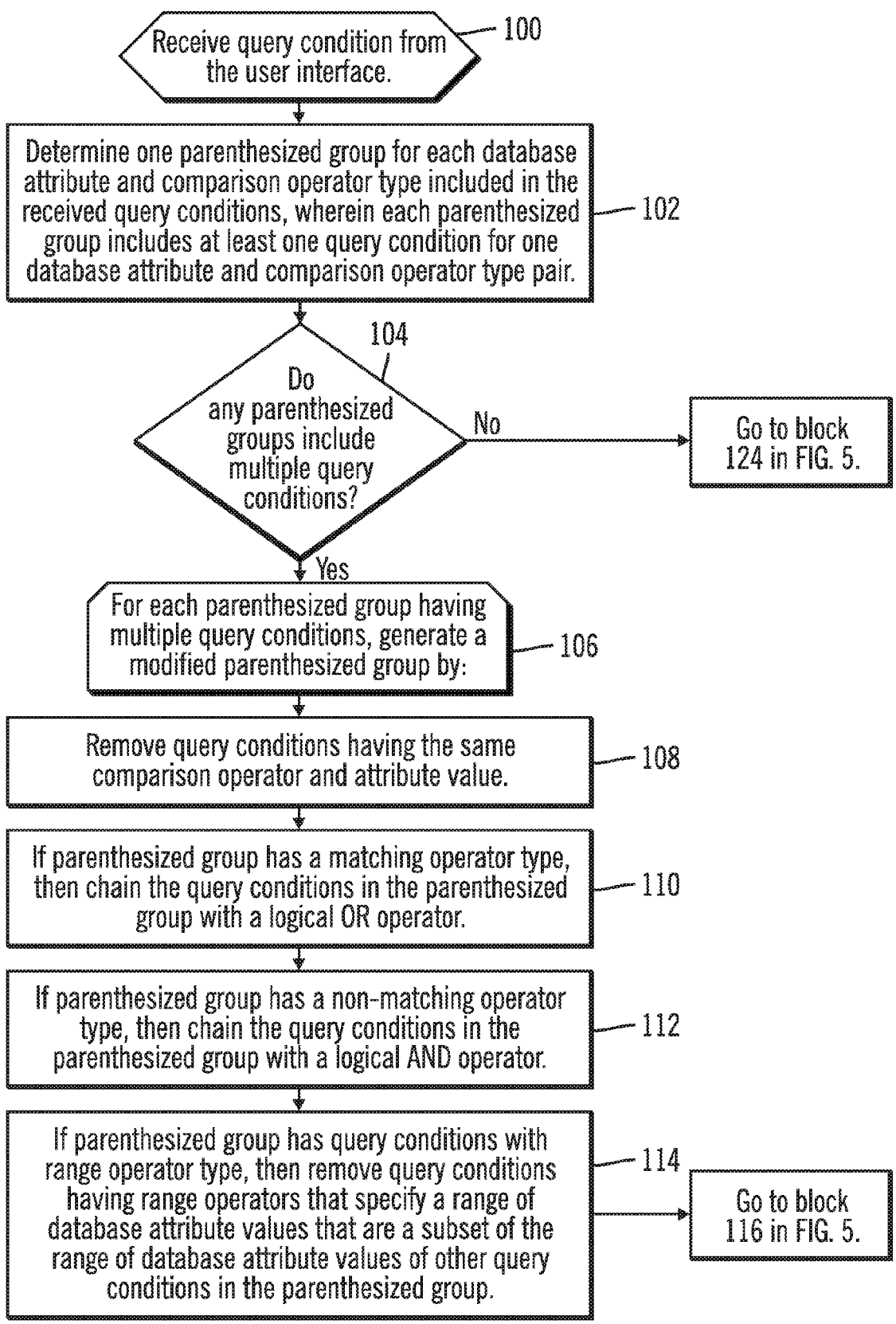
FIGS. 4 and 5 illustrate an embodiment of operations to construct a database query from received query predicates.
Figure 5:
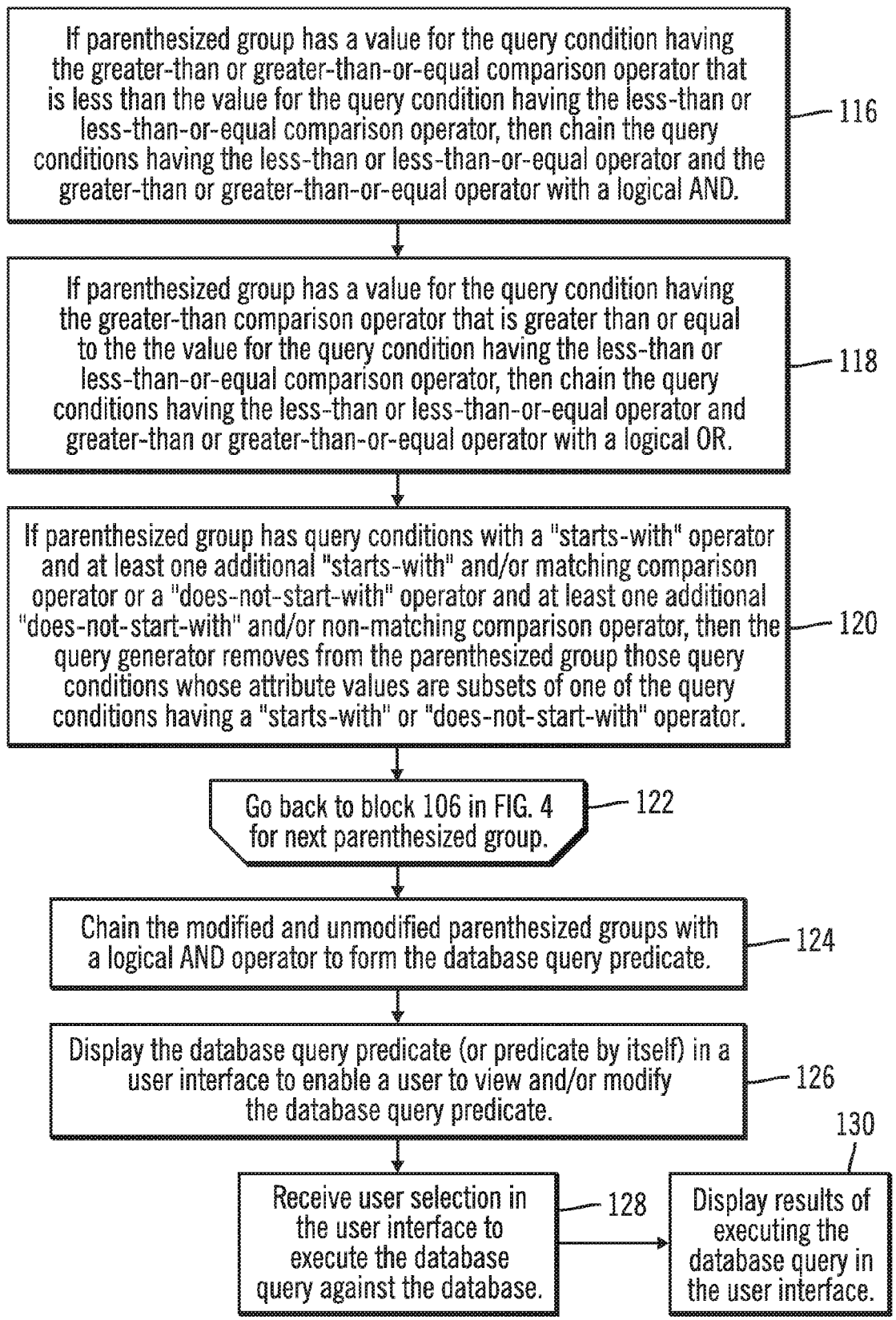

FIGS. 4 and 5 illustrate an embodiment of operations performed by the components of the database interface 8, such as the user interface generator 14, the query predicate generator 16, and the query executor 23, to construct database query predicates 18 for use in the query 26 from the received query conditions 20. Upon receiving (at block 100) from the user interface 12 or another application the query conditions 20, the query predicate generator 16 determines (at block 102) one parenthesized group 23 for each database attribute and comparison operator type pair included in the received query conditions 20. Each parenthesized group 23 includes at least one query condition, i.e., comparison operator type and value, for one database attribute.

Figure 6:
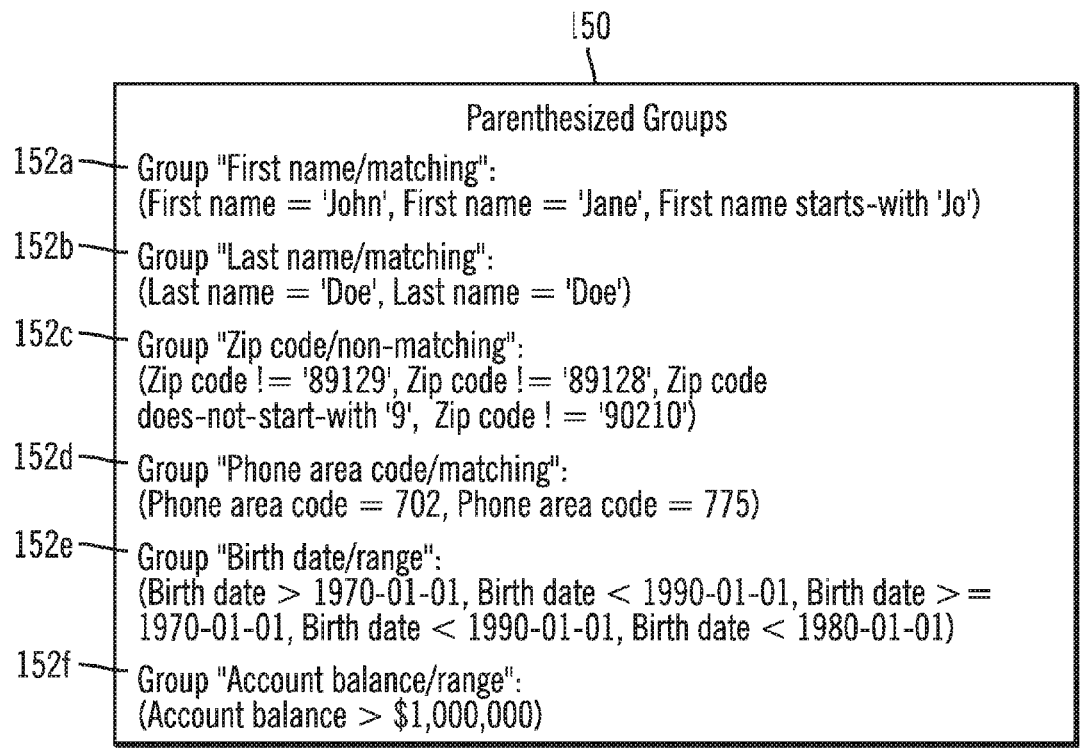

FIG. 6 provides an example of parenthesized groups 150 generated from the query conditions 70, comprising parenthesized groups 152a, 152b, 152c. 152d. 152e. 152f. For instance, parenthesized group 152a associates query conditions having a matching comparison operator type (e.g.: "=" and "starts-with") for the first name attribute; parenthesized group 152b associates query conditions having a matching comparison operator type for the last name attribute; parenthesized group 152c associates query predicates having a non-matching comparison operator type (e.g., "!=" or not-equals and "does-not-start-with") for the Zip code attribute; parenthesized group 152d associates query predicates having a matching comparison operator type (e.g., "=") for the phone area code attribute; parenthesized group 152e associates query predicates having a range comparison operator type (e.g., ">=", ">", "<", "<=") for the birth date attribute; and parenthesized group 154f associates query predicates having a range comparison operator for the account balance attribute.

Figure 7:
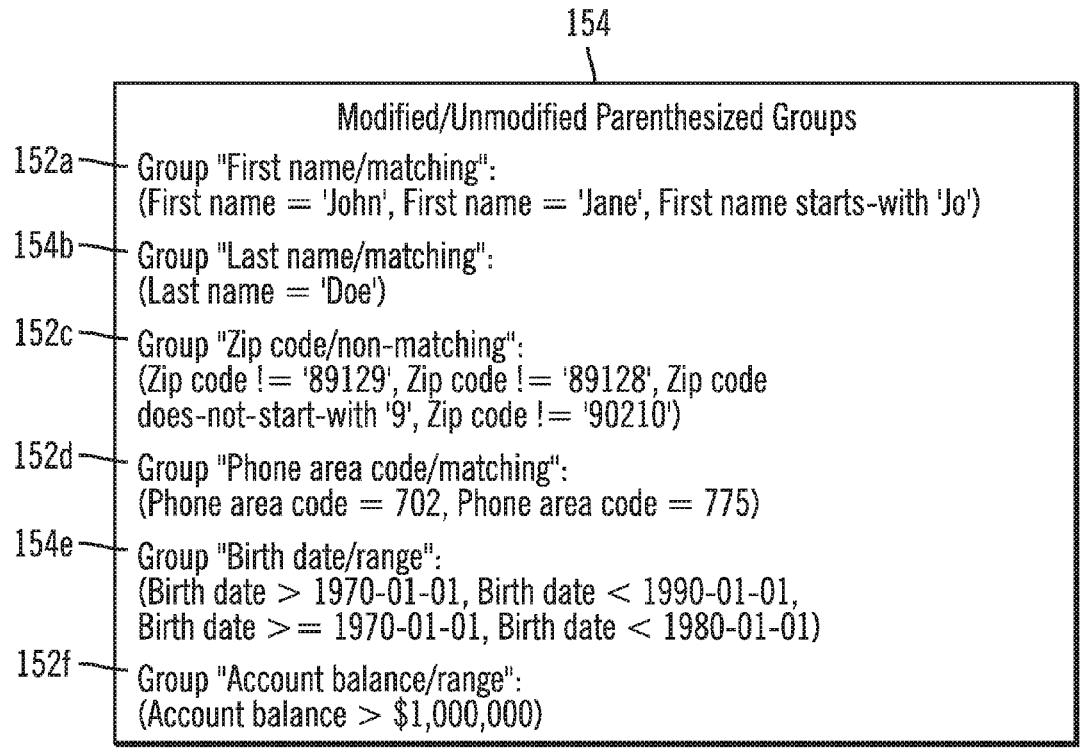

If (at block 104) any parenthesized group, e.g., 152a . . . 152f, includes multiple query conditions, then the query predicate generator 16 performs a loop of operations at blocks 106 through 122 for each parenthesized group having multiple query conditions, which in the example of FIG. 6 includes parenthesized groups 152a . . . 152e, but not 152f which has only one query condition. If (at block 104) no parenthesized group has multiple query conditions, then control proceeds to block 124 in FIG. 5. At block 108, the query predicate generator 16 removes (at block 108) duplicate query conditions having the same comparison operator and comparison value. In the example of FIG. 6, this operation at block 106 involves removing the duplicate query conditions for parenthesized groups 152b and 152e. FIG. 7 illustrates an example of modified parenthesized groups 154, including modified parenthesized groups 154b and 154e which comprise the parenthesized groups 152b and 152e (FIG. 6) with duplicate query conditions removed as a result of the operation at block 106.

If (at block 110) the parenthesized group has a matching operator type, then the query predicate generator 16 chains the query conditions in the parenthesized group with a logical OR operator. FIG. 8 illustrates an example of modified parenthesized groups 156, including modified parenthesized groups 156a and 156d which comprise the parenthesized groups 152a and 152d (FIG. 7) having query conditions with the matching comparison operator (e.g., "=", "starts-with") chained with a logical OR operator.

If (at block 112) the parenthesized group has a non-matching operator type, then the query predicate generator 16 chains the query conditions in the parenthesized group with a logical AND operator. FIG. 9 illustrates an example of modified parenthesized groups 158, including modified parenthesized group 158c which comprises the parenthesized group 152c (FIG. 8) having query conditions with the non-matching comparison operator (e.g., "!=", "does-not-start-with") chained with a logical AND operator.

If (at block 114) the parenthesized group has query conditions with a range operator type, then the query predicate generator 16 removes query conditions having range operators that specify a range of database attribute values that are a subset of the range of database attribute values of other query conditions in the same parenthesized group. For instance, if there are two query conditions in the same parenthesized group having a same attribute value and one has the less-than ("<") comparison operator and the other has the less-than-or-equal-to ("<=") operator, then the query condition with the less-than comparison operator is removed because the range specifying the less-than comparison operator is a subset of the query condition with the less-than-or-equal-to comparison operator. Likewise, if there are two query conditions in the same parenthesized group having a same attribute value and one has the greater-than (">") comparison operator and the other as the greater-than-or-equal-to (">=") operator, then the query condition with the greater-than comparison operator is removed. Further, if there are multiple query conditions in the same parenthesized group having a less than comparison operator, e.g., "<" or "<=", and different attribute values, then query predicate generator 16 discards query conditions whose attribute value is not the maximum of the attribute values for the less-than comparison operators because the range with the less-than comparison operator and lower attribute value is a subset of the query condition having a higher attribute value for the less-than (<, <=) range operator. If there are multiple query conditions in the same parenthesized group having a greater than comparison operator, e.g., ">" or ">=", and different attribute values, then the query predicate generator 16 discards query condition whose attribute value is not the minimum of the attribute values for the greater-than comparison operators because the range with the greater-than comparison operator and greater attribute value is a subset of the query condition having a lower attribute value for the greater-than (>, >=) range operator.

Figure 10:
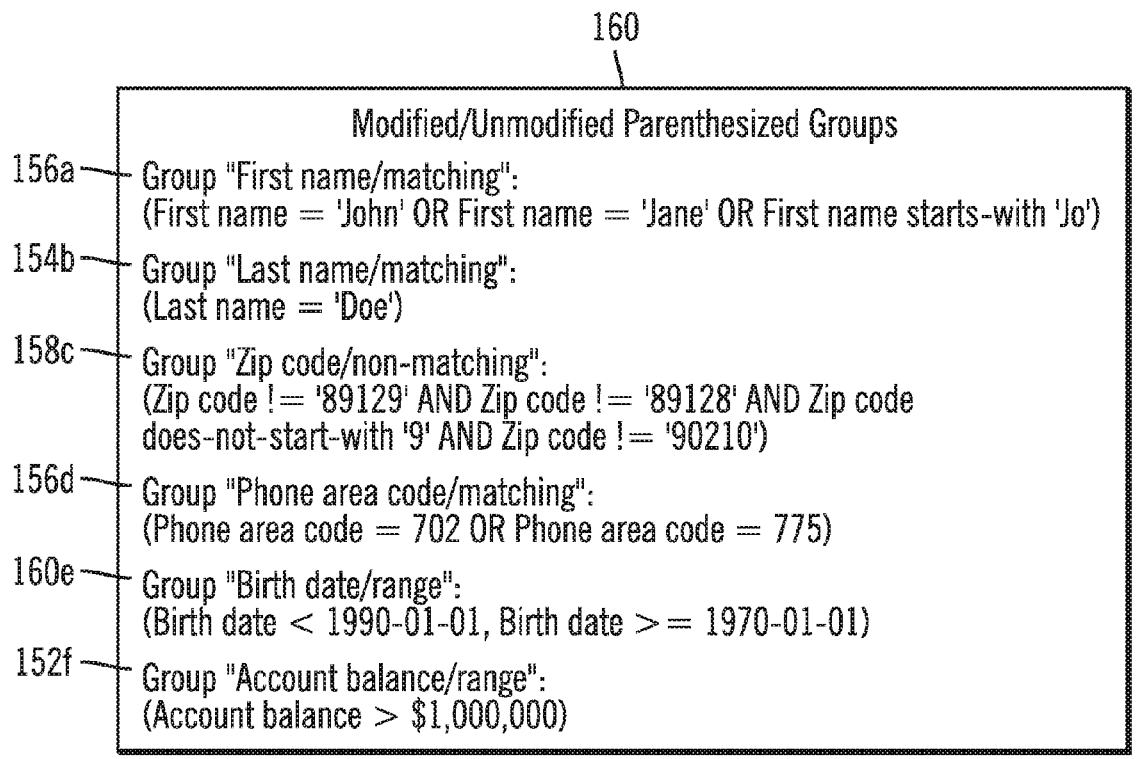

FIG. 10 illustrates an example of modified parenthesized group 160, including modified parenthesized group 160e which comprises the parenthesized group 154e (FIG. 9) with the query conditions having a range of values that are a subset of values of another query condition removed, such as performed at block 114. For instance, in parenthesized group 154e (FIG. 9), the "Birth date>1970-01-01" query condition is removed because it is a subset of the "Birth date>=1970-01-01" query condition and the "Birth date<1980-01-01" query condition is removed because it is a subset of the "Birth date<1990-01-01" query condition.

Figure 11:
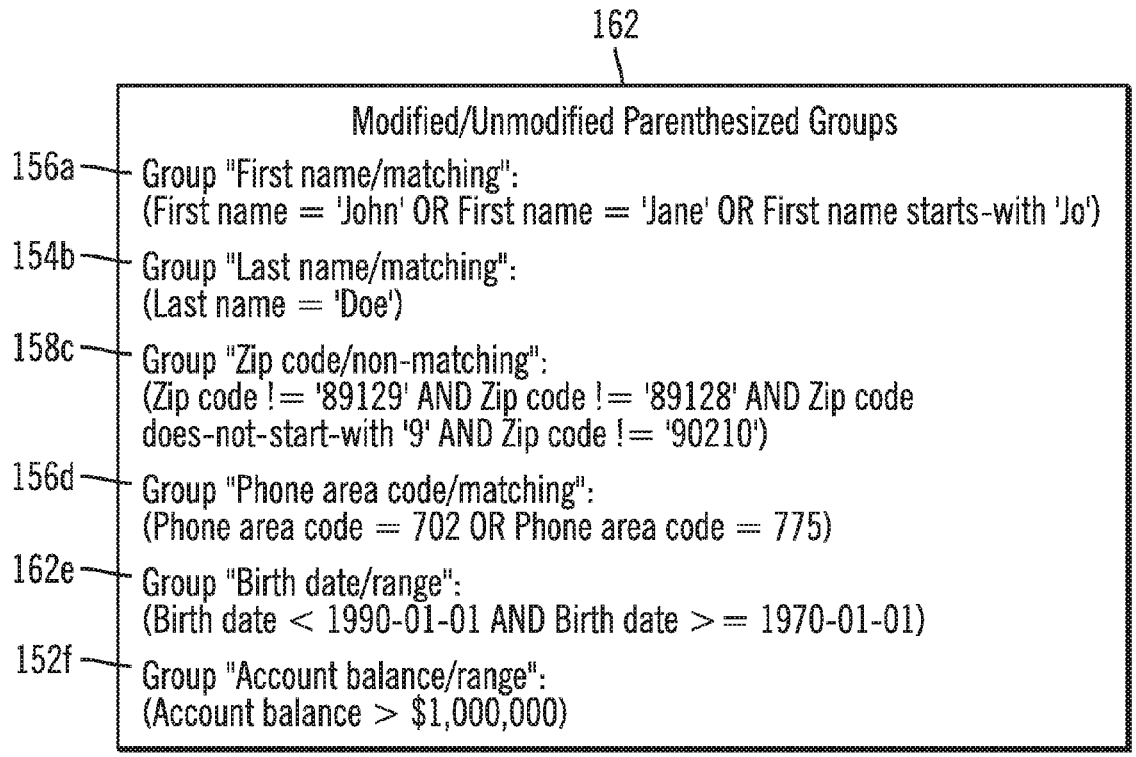

With respect to FIG. 5, if (at block 116) the parenthesized group has a value for the query condition having the greater-than comparison operator that is less than the value for the query condition having the less-than comparison operator, then the query predicate generator 16 chains the query conditions having the less-than operator and greater than operator with a logical AND. In this way, if the less-than and greater-than ranges overlap, the ranges are logically conjoined (AND'ed) to form a range of their intersection. FIG. 11 illustrates an example of modified parenthesized group 162, including modified parenthesized group 162e which comprises the parenthesized group 160e (FIG. 10) with the greater-than and less-than query conditions chained with a logical AND operator.

If (at block 118) the parenthesized group has a value for the query condition having the greater-than comparison operator that is greater than or equal to the value for the query condition having the less-than comparison operator, then the query predicate generator 16 chains the query conditions having the less-than operator and greater than operator with a logical OR operator.

If (at block 120) the parenthesized group has query conditions with a "starts-with" operator and at least one additional "starts-with" and/or matching comparison operator or a "does-not-start-with" operator and at least one additional "does-not-start-with" and/or non-matching comparison operator, then the query predicate generator 16 removes from the parenthesized group those query conditions whose attribute values are subsets of one of the query conditions having a "starts-with" or "does-not-start-with" operator. A query condition having a matching (e.g., = or "starts-with") or non-matching (e.g., != or "does-not-start-with") comparison operator is a subset of another query condition having a "starts-with" or "does-not-start-with" operator, respectively, if the attribute value starts with a substring that is also the attribute value of the other query condition having a "starts-with" or "does-not-start-with" operator. FIG. 12 illustrates an example of modified parenthesized group 164, including modified parenthesized group 164a which comprises the parenthesized group 156a (FIG. 11) with the query condition "First name='John'" removed because it starts with a prefix "Jo" that is the attribute value of the query condition specifying "starts-with Jo".

After modifying parenthesized groups 23 per the rules of FIGS. 4-5, the query predicate generator 16 chains (at block 124) the modified and unmodified parenthesized groups 24 with a logical AND operator to form the database query predicate 18 which is used in the query 26. The generated query predicate 18 would be combined with the desired record attributes to be retrieved and possibly an ordering specification to form the complete query. For instance, FIG. 13 shows the modified parenthesized groups chained together with the logical AND operator, where the AND operator comprises the query predicate generated for the parenthesized groups of attributes.

The user interface generator 14 may display (at block 126) the database query 26 or database query predicate 18 by itself in the user interface 12 to enable a user to view and modify the database query predicate 18. The query executor 22 receives (at block 128) user selection to execute the database query 18 against the database 10. The user interface generator 14 may display (at block 130) results of executing the database query 18 in the user interface 12

The described embodiments provide techniques to infer logical operators and order of precedence to chain provided query conditions to form a database query predicate for comparison operator types such as matching, non-matching, and range. The described embodiments further provide techniques to form parenthesized groups of query conditions having a same database attribute and comparison operator type pair and then consolidate the query conditions in the parenthesized groups and generate logical operators to chain the query conditions in the parenthesized groups.

Additional Embodiment Details

The described operations may be implemented as a method, apparatus or article of manufacture using standard programming and/or engineering techniques to produce software, firmware, hardware, or any combination thereof. The term "article of manufacture" as used herein refers to code or logic implemented in a medium, where such medium may comprise a hardware device having hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The computer readable medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 4 and 5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method, comprising:
   receiving a plurality of query conditions for a database,
      wherein each query condition includes a comparison operator and a comparison value for a database attribute, wherein the comparison operator comprises at least one of a matching operator, a non-matching operator, and a range operator, and
      wherein the plurality of query conditions include:
         (i) a first query condition having and a first comparison operator selected from a greater-than operator and a greater-than-or-equal-to operator, wherein the first comparison operator is associated with a first comparison value; and
         (ii) a second query condition having a second comparison operator selected from a less-than operator and a less-than-or-equal-to operator, wherein the second comparison operator is associated with a second comparison value, and
      wherein the first condition and the second condition are determined to belong to a first parenthesized group;
   executing a query predicate generator by one or more computer processors to programmatically determine, based on the query conditions, at least one logical operator to include between the query conditions,
      wherein the first parenthesized group having the first comparison operator and the second comparison operator is modified based on the at least one logical operator, and
      wherein determining the at least one logical operator comprises:
         upon determining that the first comparison value is less than the second comparison value, chaining the first and second query conditions with a logical AND operator; and upon determining that the first comparison value is greater than the second comparison value, chaining the first and second query conditions with a logical OR operator; and programmatically generating at least one database query predicate to include in a database query to apply against the database for obtaining a set of query results, wherein the database query includes the received query conditions chained using the determined at least one logical operator.

2. The method of claim 1, wherein the method further comprises:

determining at least one parenthesized group including the first parenthesized group, wherein each of the at least one parenthesized group includes at least one query condition providing at least one comparison operator and value for the same database attribute;

wherein query conditions within each group having multiple query conditions are processed to determine at least one logical operator to chain the query conditions in the respective group; and for parenthesized groups having multiple query conditions, generating modified parenthesized groups having the query conditions in the parenthesized group chained with the determined at least one logical operator, wherein the database query predicate comprises the modified parenthesized groups and parenthesized groups having only one query condition.

3. The method of claim 2, wherein determining at least one logical operator to include between the query conditions further comprises:

upon determining that a comparison operator of a second parenthesized group comprises a matching operator, chaining a first query condition and a second query condition in the second parenthesized group with the logical OR operator.

4. The method of claim 2, wherein determining at least one logical operator to include between the query conditions further comprises:

upon determining that a comparison operator of a second parenthesized group comprises a non-matching operator, chaining a first query condition and a second query condition in the second parenthesized group with the logical AND operator.

5. The method of claim 1, further comprising:

generating a modified parenthesized group by removing at least one query condition from one parenthesized group having range operators that specify a range of database attribute values that are a subset of the range of database attribute values of at least one other query condition in the parenthesized group.

6. The method of claim 2, further comprising:

determining query conditions in a second parenthesized group having query predicates with a "starts-with" operator and at least one additional "starts-with" and/or "equals" ("=") comparison operator and/or a "does-not-start-with" operator and at least one additional "does-not-start-with" and/or "not-equal-to" ("!=") comparison operator; and removing from the second parenthesized group those determined query conditions whose at least one specified attribute value is a subset of one of the query conditions having a "starts-with" or "does-not-start-with" operator.

7. The method of claim 2, further comprising:

chaining the modified parenthesized group and at least one unmodified parenthesized group with the logical AND operator, wherein the database query predicate comprises the chained parenthesized groups.

8. The method of claim 1, wherein the database query is displayed in a user interface configured to allow a user to modify and view the database query;

receiving user selection in the user interface to execute the database query against the database; and displaying results of executing the database query in the user interface.

9. A system, comprising:

a computer processor;

a database;

a query predicate generator which, when executed by the computer processor, causes operations comprising:

receiving a plurality of query conditions, wherein each query condition includes a comparison operator and a comparison value for a database attribute, wherein the comparison operator comprises at least one of a matching operator, a non-matching operator, and a range operator, and wherein the plurality of query conditions include:

(i) a first query condition having a first comparison operator selected from a greater-than operator and a greater-than-or-equal-to operator, wherein the first comparison operator is associated with a first comparison value; and (ii) a second query condition having a second comparison operator selected from a less-than operator and a less-than-or-equal-to operator, wherein the second comparison operator is associated with a second comparison value, and wherein the first condition and the second condition are determined to belong to a parenthesized group;

determining, based on the query conditions, at least one logical operator to include between the query conditions, wherein the first parenthesized group having the first comparison operator and the second comparison operator is modified based on the at least one logical operator, and wherein determining the at least one logical operator comprises:

upon determining that the first comparison value is less than the second comparison value, chaining the first and second query conditions with a logical AND operator; and upon determining that the first comparison value is greater than the second comparison value, chaining the first and second query conditions with a logical OR operator; and programmatically generating at least one database query predicate to include in a database query to apply against the database for obtaining a set of query results, wherein the database query includes the received query conditions chained using the determined at least one logical operator.

10. The system of claim 9, wherein the operations further comprise:

determining at least one parenthesized group including the first parenthesized group, wherein each of the at least one parenthesized group includes at least one query condition providing at least one comparison operator and value for the same database attribute;

wherein query conditions within each group having multiple query conditions are processed to determine at least one logical operator to chain the query conditions in the respective group; and for parenthesized groups having multiple query conditions, generating modified parenthesized groups having the query conditions in the parenthesized group chained with the determined at least one logical operator, wherein the database query predicate comprises the modified parenthesized groups and parenthesized groups having only one query condition.

11. The system of claim 10, wherein determining at least one logical operator to include between the query conditions further comprises:

upon determining that a comparison operator of a second parenthesized group comprises a matching operator, chaining a first query condition and a second query condition in the second parenthesized group with the logical OR operator.

12. The system of claim 10, wherein determining at least one logical operator to include between the query conditions further comprises:

upon determining that a comparison operator of a second parenthesized group comprises a non-matching operator, chaining a first query condition and a second query condition in the second parenthesized group with the logical AND operator.

13. The system of claim 9, wherein the operations further comprise:

generating a modified parenthesized group by removing at least one query condition from one parenthesized group having range operators that specify a range of database attribute values that are a subset of the range of database attribute values of at least one other query condition in the parenthesized group.

14. The system of claim 10, wherein the operations further comprise:

determining query conditions in a second parenthesized group having query predicates with a "starts-with" operator and at least one additional "starts-with" and/or "equals" ("=") comparison operator and/or a "does-not-start-with" operator and at least one additional "does-not-start-with" and/or "not-equal-to" ("!=") comparison operator; and removing from the second parenthesized group those determined query conditions whose at least one specified attribute value is a subset of one of the query conditions having a "starts-with" or "does-not-start-with" operator.

15. The system of claim 10, wherein the operations further comprise:

chaining the modified parenthesized group and at least one unmodified parenthesized group with the logical AND operator, wherein the database query predicate comprises the chained parenthesized groups.

16. The system of claim 9, wherein the operations further comprise:

a user interface for causing operations, the operations comprising:
  displaying the database query to allow a user to modify and view the database query;
  receiving user selection to execute the database query against the database; and
  displaying results of executing the database query in the user interface.

17. A computer readable storage medium having code for causing operations to be performed for processing a query for a database, the operations comprising:

receiving a plurality of query conditions,
  wherein each query condition includes a comparison operator and a comparison value for a database attribute, wherein the comparison operator comprises at least one of a matching operator, a non-matching operator, and a range operator, and
  wherein the plurality of query conditions include:
    (i) a first query condition having a first comparison operator selected from a greater-than operator and a greater-than-or-equal-to operator, wherein the first comparison operator is associated with a first comparison value; and
    (ii) a second query condition having a second comparison operator selected from a less-than operator and a less-than-or-equal-to operator, wherein the second comparison operator is associated with a second comparison value, and
  wherein the first condition and the second condition are determined to belong to a first parenthesized group;

executing a query predicate generator to programmatically determine, based on the query conditions, at least one logical operator to include between the query conditions,
  wherein the first parenthesized group having the first comparison operator and the second comparison operator is modified based on the at least one logical operator, and
  wherein determining the at least one logical operator comprises:
    upon determining that the first comparison value is less than the second comparison value, chaining the first and second query conditions with a logical AND operator; and
    upon determining that the first comparison value is greater than the second comparison value, chaining the first and second query conditions with a logical OR operator; and programmatically generating at least one database query predicate to include in a database query to apply against the database for obtaining a set of query results,
  wherein the database query includes the received query conditions chained using the determined at least one logical operator.

18. The computer readable storage medium of claim 17, wherein the operations further comprise:

determining at least one parenthesized group including the first parenthesized group, wherein each of the at least one parenthesized group includes at least one query condition providing at least one comparison operator and value for the same database attribute;

wherein query conditions within each group having multiple query conditions are processed to determine at least one logical operator to chain the query conditions in the respective group; and for parenthesized groups having multiple query conditions, generating modified parenthesized groups having the query conditions in the parenthesized group chained with the determined at least one logical operator, wherein the database query predicate comprises the modified parenthesized groups and parenthesized groups having only one query condition.

19. The computer readable storage medium of claim 18, wherein determining at least one logical operator to include between the query conditions further comprises:
 upon determining that a comparison operator of a second parenthesized group comprises a matching operator, chaining a first query condition and a second query condition in the second parenthesized group with the logical OR operator.

20. The computer readable storage medium of claim 18, wherein determining at least one logical operator to include between the query conditions further comprises:
 upon determining that a comparison operator of a second parenthesized group comprises a matching operator, chaining a first query condition and a second query condition in the second parenthesized group with the logical OR operator.

21. The computer readable storage medium of claim 17, wherein the operations further comprise:
 generating a modified parenthesized group by removing at least one query condition from one parenthesized group having range operators that specify a range of database attribute values that are a subset of the range of database attribute values of at least one other query condition in the parenthesized group.

22. The computer readable storage medium of claim 18, wherein the operations further comprise:
 determining query conditions in a second parenthesized group having query predicates with a "starts-with" operator and at least one additional "starts-with" and/or "equals" ("=") comparison operator and/or a "does-not-start-with" operator and at least one additional "does-not-start-with" and/or "not-equal-to" ("!=") comparison operator; and
 removing from the second parenthesized group those determined query conditions whose at least one specified attribute value is a subset of one of the query conditions having a "starts-with" or "does-not-start-with" operator.

23. The computer readable storage medium of claim 18, wherein the operations further comprise:
 chaining the modified parenthesized group and at least one unmodified parenthesized group with the logical AND operator, wherein the database query predicate comprises the chained parenthesized groups.

24. The computer readable storage medium of claim 17, wherein the operations further comprise:
 displaying the database query in a user interface configured to allow a user to modify and view the database query;
 receiving user selection in the user interface to execute the database query against the database; and
 displaying results of executing the database query in the user interface.

\* \* \* \* \*